United States Patent [19]

Ertingshausen et al.

[11] Patent Number: 4,549,238
[45] Date of Patent: Oct. 22, 1985

[54] MAGNETIC HEAD SLIDER OF CERAMIC MATERIAL

[75] Inventors: Friedrich Ertingshausen, Nieder-Olm; Volker Heinrich, Wiesbaden; Holger Hinkel, Böblingen; Gerhard Kaus, Mötzingen; Jürgen Kempf, Schönaich; Hans-Georg Nauth, Mainz; Manfred Schrader, Böblingen, all of Fed. Rep. of Germany

[73] Assignee: International Business Machines Corporation, Armonk, N.Y.

[21] Appl. No.: 456,641

[22] Filed: Jan. 10, 1983

[30] Foreign Application Priority Data

Mar. 25, 1982 [DE] Fed. Rep. of Germany ..... 82102505

[51] Int. Cl.⁴ .............................................. G11B 17/32
[52] U.S. Cl. .................................... 360/103; 360/110
[58] Field of Search ....................... 360/122, 103, 110; 29/603; 156/643

[56] References Cited

U.S. PATENT DOCUMENTS 4,251,841  2/1981  Jacobs ................................ 360/122

Primary Examiner—A. J. Heinz
Attorney, Agent, or Firm—Henry E. Otto, Jr.

[57] ABSTRACT

A magnetic head slider consisting of a mixed ceramic made of aluminum oxide/titanium carbide has on its sliding side adjacent a magnetic record carrier a thin layer from which the titanium carbide component has been removed. The titanium carbide component preferably is removed by preferential reactive ion etching in a $CF_4$ plasma. The magnetic head slider with its sliding surface thus modified exhibits greatly improved sliding properties compared with sliders of the same material having a non-modified sliding surface.

7 Claims, 3 Drawing Figures

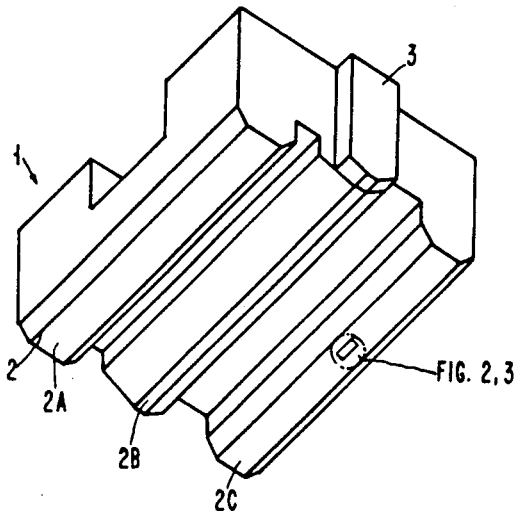

MAGNETIC HEAD SLIDER OF CERAMIC MATERIAL

TECHNICAL FIELD

The invention relates to a magnetic head slider, and more particularly to a magnetic head slider for magnetic heads flying over an air cushion and consisting of a ceramic material of aluminum oxide and titanium carbide, preferably about 70% $Al_2O_3$ and 30% TiC.

BACKGROUND ART

U.S. Pat. No. 4,251,841 discloses a magnetic head slider of a ceramic material comprising substantially 70% $Al_2O_3$ and 30% TiC. This material is rather easy to process, is resistant to fracture, has high abrasion qualities, and a long lifetime, and is electrically conductive.

As the data density per surface unit of magnetic storage disks increases, it is necessary to reduce the distance between the magnetic head and disk surface, thus reducing the air cushion between the slider carrying the magnetic head, and disk surface. This increases the frequency and likelihood of the slider undesirably impacting the disk during its movement relative to the record carrier. To avoid collisions between head and disk and consequent damage to both, or at least to decrease the defects thus caused, as well as to improve the conditions upon start and stop, it is known to apply a lubricant on the disk. Actual use revealed the fact that a too thin lubricant film cannot reliably prevent the damaging of the disk upon contact with the head, whereas a too thick lubricant film has the effect that at the beginning of the relative movement between disk and head, i.e. upon starting, the magnetic head slider sticks to the disk. Upon starting, the slider may therefore to torn off its arm, or the arm may become bent, or there may be further damage. To apply a lubricant film in precisely the correct thickness, and to keep it at that thickness is very complicated and in actual use very difficult to consistently reproduce. On the other hand, investigations have shown that the surface of the magnetic head slider opposite the disk surface considerably influences the behavior with respect to the contact between head and disk.

SUMMARY OF THE INVENTION

The present invention is intended to remedy these drawbacks. The invention as characterized in the claims achieves the object of modifying a magnetic head slider of the type defined in the preamble of claim 1 in such a manner that its flight and sliding characteristics in the start and stop phases are much improved, by reducing the number of collisions between head and disk (head-disk interferences), and thus extending considerably the useful lifetime of the magnetic head sliders and magnetic disk.

In accordance with the invention, the lifetime of such magnetic head sliders is extended considerably by removing the TiC component in a thin layer directly beneath the surface on the sliding side of a slider that consists of aluminum oxide and titanium carbide. The increased lifetime is achieved because a much higher number of start/stop phases, i.e. of starting and stopping the disk, can be carried out than before without a fatally damaging contact between head and disk. This ensures a considerably increased lifetime both of the magnetic head slider and the associated disk. It furthermore reduces the number of failures of the magnetic disk systems.

According to an advantageous embodiment, the titanium carbide component is dissolved in the sliding surface of the slider through preferential etching with a reactive ion etching process. This etching process does not affect the affixed magnetic head since only a few nanometers of material are removed at the metallic magnetic head.

BRIEF DESCRIPTION OF THE DRAWINGS

The invention will now be discussed in detail with reference to drawings representing a possible embodiment and wherein:

FIG. 1 is a perspective view a magnetic head slider with affixed magnetic head which on the sliding side comprises three rail-like sliding faces, and which consists of the mixed ceramic of $Al_2O_3$ and TiC;

FIG. 2 is a plan view to enlarged scale of a portion of the sliding surface; and FIG. 3 is a fragmentary sectional view along line 3—3 of FIG. 2 which represents the structuring and the material components.

DESCRIPTION OF PREFERRED EMBODIMENT

As illustrated in FIG. 1, a magnetic head slider 1 is equipped on its sliding side 2 with longitudinal rails 2A, 2B and 2C. On the two outer rails 2A and 2C, the air cushion is formed during the flight over a magnetic disk (not shown), said air cushion carrying the entire magnetic head slider 1 with an affixed magnetic head 3. Magnetic head 3 is provided at the end of the center rail 2B. This head can contain a thin film transducer. If desired, however, the construction may be modified in such a way that thin film heads are arranged at the respective ends of the two outer longitudinal rails 2A and 2C. Other designs of sliding surface 2 are also possible.

The magnetic head slider 1 is made of ceramic material consisting of a mixture of aluminum oxide and titanium carbide, approximately 70% $Al_2O_3$ and 30% TiC preferably being used.

FIG. 2 is a plan view, to enlarged scale, of the sliding surface 2 of sliding rail 2C constructed in accordance with the invention, and FIG. 3 is a longitudinal sectional view of sliding surface 2 in accordance with the invention. The material consists primarily of $Al_2O_3$ with TiC particles embedded therein.

According to the invention, the TiC component is removed or dissolved in a layer 4 which is directly beneath sliding surface 2 and has a thickness between 10 and 100 nm, preferably between 20 and 50 nm. The planarity of the sliding surface is still denoted by the line 2 (FIG. 3), but in regions 5 it has recesses and pits depending on the thickness of layer 4. Consequently, the sliding surface plane 2 is determined exclusively by the component $Al_2O_3$. The TiC component therefore no longer has any influence on the sliding surface 2 even though, as shown in FIG. 2, parts of the individual TiC particles beneath layer 4 are exposed toward but below the surface.

Examinations have shown that magnetic head sliders with a surface designed in accordance with the invention have a start/stop behavior which is much better than that of similarly designed magnetic head sliders made of the same material whose surface on the sliding side has not been modified in accordance with the invention. No final explanation can be supplied yet for this substantial amelioration of the flight or abrasion characteristics of the magnetic head slider designed in accordance with the invention. It could be assumed that the pits or recesses caused by the dissolution of the TiC component in layer 4 immediately beneath the surface could contain lubricants, and that consequently the lubrication between sliders and disk is improved. However, this explanation is disproved by the fact that if Al₂O₃ is dissolved out of the surface, with TiC remaining, and with an equal number of recesses and consequently an unchanged lubricant reservoir the flight characteristics relative to a non-modified slider are not improved. This has been found out in comparative tests.

The improvement of the flight characteristics of the magnetic head slider as designed in accordance with the invention is thus due to the specific removal of a material component, i.e. the TiC component. The sliding surface 2 of the magnetic head slider consists of $Al_2O_3$ exclusively. The magnetic disk used for test purposes contains magnetic particles in a synthetic resin layer. It is known from arthroprosthetics, particularly from human hip-joint prosthetics that in combination with synthetic material $Al_2O_3$ ceramics show extremely positive tribological characteristics. Furthermore, the electrical field between the disk surface and the sliding surface of the magnetic head slider can be positively influenced, and can contribute to reduction in the abrasion, the so-called debris, at the magnetic head slider. Besides an electric field there is also in the present electrically conductive magnetic head slider, owing to an influenced charge.

The dissolution of the TiC component in layer 4 directly beneath the surface can be effected by a reactive ion etching process employing preferential etching. Even if the etching time is longer than necessary, magnetic head 3 does not have to be covered since this etching process does not negatively influence write-/read element 3. The etching is preferably implemented in a $CF_4$ plasma.

The reactive ion etching is accomplished in a parallel plate reactor under the following conditions:

plasma: $CF_4$
flow quantity: 18 ml/min
pressure: $8 \times 10^{-3}$ mbar
power: 1500 Watt
cathode material: Ti
etching rate: >1 nm/sec
etching time: 30 sec With an etching time of 30 sec and an etching rate of slightly more than 1 nm/sec, the thickness of layer 4 is more than 20 nm. Tests with a magnetic head slider of that design resulted in the fourfold amount of possible start/stop phases compared with non-conditioned magnetic head sliders of the same material, and of the same form, and under otherwise unchanged conditions.

In the etching process used it is possible that sharp edges on sliding side 2 of the magnetic head slider are chamfered so that the assembling of debris at these edges by influenced charges is prevented, if not avoided altogether.

The magnetic head slider designed in accordance with the invention considerably increases the lifetime of magnetic disks and heads, compared with the same magnetic head slider with an unmodified sliding surface.

We claim:

1. A magnetic head slider, particularly for magnetic heads flying on an air cushion over a moving magnetic data track, said slider having at least one surface containing a ceramic material including aluminum oxide and titanium carbide, characterized in that said surface is adapted to be adjacent the data track during operation and further characterized in that substantially all of the titanium carbide has been removed substantially to a preselected depth to create a series of isolated pits or recesses in said surface.

2. A magnetic head slider as claimed in claim 1, characterized in that the preselected depth to which the titanium carbide has been removed is between 10 and 100 nanometers.

3. A magnetic head slider as claimed in claim 1, characterized in that the preselected depth to which titanium carbide is removed is 20 to 50 nanometers.

4. A magnetic head slider as claimed in claim 1, characterized in that the ceramic material consists of approximately 70% aluminum oxide and 30% titanium carbide.

5. A magnetic head slider as claimed in claim 1, characterized in that the recesses result from removal of titanium carbide by reactive ion etching.

6. A magnetic head slider as claimed in claim 1, characterized in that the recesses result from removal of titanium carbide by preferential etching with reactive ion etching effected in a $CF_4$ plasma.

7. A method of making a magnetic head slider of the type intended to fly over a moving magnetic disk, said slider having a surface that will be adjacent the magnetic disk during operation, and is formed of a ceramic material containing aluminum oxide and titanium carbide, comprising the step of removing the titanium carbide from said surface to a preselected depth by preferential reactive ion etching effected in a $CF_4$ plasma, thereby to create voids in said surface to increase the working lifetime of the slider and disk.

* * * * *